US009593630B2

(12) United States Patent
Yoshida et al.

(10) Patent No.: US 9,593,630 B2
(45) Date of Patent: Mar. 14, 2017

(54) ENGINE OUTPUT CONTROL DEVICE FOR A CONSTRUCTION MACHINE

(71) Applicant: HITACHI CONSTRUCTION MACHINERY CO., LTD., Tokyo (JP)

(72) Inventors: Hajime Yoshida, Omihachiman (JP); Shuuhei Noguchi, Higashiomi (JP)

(73) Assignee: HITACHI CONSTRUCTION MACHINERY TIERRA CO., LTD., Shiga (JP)

( * ) Notice: Subject to any disclaimer, the term of this patent is extended or adjusted under 35 U.S.C. 154(b) by 269 days.

(21) Appl. No.: 14/357,006

(22) PCT Filed: Dec. 24, 2012

(86) PCT No.: PCT/JP2012/083373
§ 371 (c)(1),
(2) Date: May 8, 2014

(87) PCT Pub. No.: WO2013/111489
PCT Pub. Date: Aug. 1, 2013

(65) Prior Publication Data
US 2014/0324322 A1    Oct. 30, 2014

(30) Foreign Application Priority Data

Jan. 25, 2012    (JP) .................................. 2012-12917

(51) Int. Cl.
*F02D 41/22* (2006.01)
*F02D 33/00* (2006.01)
(Continued)

(52) U.S. Cl.
CPC .............. *F02D 33/00* (2013.01); *E02F 3/325* (2013.01); *E02F 9/2066* (2013.01);
(Continued)

(58) Field of Classification Search
CPC ...... F02D 41/22; F02D 31/001; F02D 31/007; F02D 31/009; F02D 2041/227;
(Continued)

(56) References Cited

U.S. PATENT DOCUMENTS 5,070,832 A * 12/1991 Hapka ...................... F01M 1/22
123/198 D
7,255,088 B2 * 8/2007 Nakamura ............ F02D 31/007
123/339.16
(Continued)

FOREIGN PATENT DOCUMENTS

JP    63-259139 A    10/1988
JP    05-280070 A    10/1993
(Continued)

OTHER PUBLICATIONS

Extended European Search Report received in corresponding European Application No. 12866678.1 dated Sep. 1, 2015.
(Continued)

*Primary Examiner* — Lindsay Low
*Assistant Examiner* — Robert Werner
(74) *Attorney, Agent, or Firm* — Mattingly & Malur, PC

(57) ABSTRACT

During an operation, a control device (38) for performing output control of an engine (10) determines whether or not the engine (10) and/or an exhaust gas purifying device (18) has a malfunction. If it is determined that the engine (10) and/or the exhaust gas purifying device (18) has a malfunction, a highest rotational speed of the engine (10) is controlled to a second rotational speed (Nt) higher by a predetermined amount (α) than a first rotational speed (Ns) at which an engine maximum torque (Tm) before the malfunction can be outputted. In this case, a maximum fuel injection (Continued)

quantity of the engine (10) is limited so that a rated torque (Tr) before the malfunction can be outputted at the first rotational speed (Ns).

5 Claims, 9 Drawing Sheets

(51) Int. Cl.
*F02D 29/04* (2006.01)
*E02F 9/20* (2006.01)
*E02F 9/26* (2006.01)
*F02D 31/00* (2006.01)
*E02F 3/32* (2006.01)
*F01N 11/00* (2006.01)
*E02F 9/22* (2006.01)
*F01N 3/023* (2006.01)
*F01N 3/021* (2006.01)

(52) U.S. Cl.
CPC .......... *E02F 9/2246* (2013.01); *E02F 9/2285* (2013.01); *E02F 9/2296* (2013.01); *E02F 9/268* (2013.01); *F01N 11/00* (2013.01); *F02D 29/04* (2013.01); *F02D 31/009* (2013.01); *F02D 41/22* (2013.01); *F01N 3/021* (2013.01); *F01N 3/023* (2013.01); *F01N 2900/1404* (2013.01); *F01N 2900/1621* (2013.01); *F02D 2041/226* (2013.01); *F02D 2041/227* (2013.01); *Y02T 10/40* (2013.01); *Y02T 10/47* (2013.01)

(58) Field of Classification Search
CPC .... F02D 2009/0277; F02D 29/04; E02F 9/24; E02F 9/267; E02F 9/268; E02F 9/2066
USPC .......................... 123/395; 701/103, 107, 110
See application file for complete search history.

(56) References Cited

U.S. PATENT DOCUMENTS

| | | | |
|---|---|---|---|
| 2011/0202261 A1* | 8/2011 | Adachi | F02D 31/001 701/104 |
| 2013/0086890 A1* | 4/2013 | Noma | F02D 41/029 60/277 |
| 2013/0091831 A1* | 4/2013 | Noma | F01N 3/0235 60/311 |

FOREIGN PATENT DOCUMENTS

| | | | |
|---|---|---|---|
| JP | 07-127605 A | | 5/1995 |
| JP | 3708563 B2 | | 10/2005 |
| JP | 2009-121443 A | | 6/2009 |
| JP | 2010-065425 A | | 3/2010 |
| JP | 2010-96090 A | | 4/2010 |
| JP | 2010-229985 A | | 10/2010 |
| JP | 2010-236363 A | | 10/2010 |
| JP | 2011-236767 A | | 11/2011 |
| JP | 2011236767 A | * | 11/2011 |
| JP | 2011252435 A | * | 12/2011 |

OTHER PUBLICATIONS

Japanese Office Action received in corresponding Japanese Application No. 2013-555157 dated Nov. 4, 2015.

* cited by examiner

ENGINE OUTPUT CONTROL DEVICE FOR A CONSTRUCTION MACHINE

TECHNICAL FIELD

The present invention relates to a construction machine such as a hydraulic excavator, a hydraulic crane and the like on which an electronically controlled engine or an exhaust gas purifying device is mounted, for example.

BACKGROUND ART

As the construction machine such as a hydraulic excavator, a hydraulic crane and the like, those on which a diesel engine electronically controlled by a control device (controller) is mounted are known (Patent Document 1, Patent Document 2). An exhaust gas purifying device for purifying an exhaust gas is provided on the diesel engine (Patent Document 3).

Here, the exhaust gas purifying device includes an oxidation catalyst (also referred to as a Diesel Oxidation Catalyst or abbreviated as DOC, for example) for oxidizing and removing nitrogen monoxide (NO), carbon monoxide (CO), hydrocarbon (HC) and the like contained in the exhaust gas and a particulate matter removing filter (also referred to as a Diesel Particulate Filter or abbreviated as DPF, for example) arranged on a downstream side of the oxidation catalyst and trapping and removing a particulate matter in the exhaust gas.

PRIOR ART DOCUMENT

Patent Document

Patent Document 1: Japanese Patent Laid-Open No. Hei 5-280070 A
Patent Document 2: Japanese Patent Laid-Open No. Hei 7-127605 A (Japanese Patent No. 3708563 B2)
Patent Document 3: Japanese Patent Laid-Open No. 2010-236363 A

SUMMARY OF THE INVENTION

Incidentally, in case the engine or the exhaust gas purifying device enters a malfunction state in which desired performances cannot be exerted due to an influence of a fuel characteristic or a use environment, if its operation is continued as it is, the malfunction becomes serious or the particulate matter excessively deposits on the filter of the exhaust gas purifying device, and there is a concern that the filter is eroded. Thus, in the electronically controlled engine, it is configured that, incase the engine or the exhaust gas purifying device enters the malfunction state, a protection mode operation, that is, control for lowering an engine output by limiting a fuel injection quantity more than usual is performed.

On the other hand, in a small-sized hydraulic excavator called mini excavator, for example, a hydraulic pump of a variable displacement type driven by the engine, constant torque control is executed so that a product of a delivery pressure (P) and a delivery flow rate (Q) becomes constant. In other words, in the small-sized hydraulic excavator, the control of increasing/decreasing a maximum torque of the hydraulic pump is not executed. In this case, incase the engine output is lowered by the protection mode operation, the engine enters an overload state, and there is a concern that engine stall occurs. If the engine abruptly stops, there is a concern that the excavator becomes unable to be self-propelled and moved to a place for service from a work site.

In view of the above-discussed problems with the conventional art, it is an object of the present invention to provide a construction machine configured to have a hydraulic pump subjected to constant torque control mounted and capable of being stably moved to the place for service even in a state of malfunction of the engine or the exhaust gas purifying device.

(1) The construction machine according to the present invention includes an automotive vehicle body; an engine mounted on the vehicle body and electronically controlled by a control device; an exhaust gas purifying device provided on an exhaust side of the engine and purifying an exhaust gas; a hydraulic pump of a variable displacement type driven by the engine and subjected to constant torque control so that a product of a delivery pressure (P) and a delivery flow rate (Q) becomes constant; and a hydraulic actuator driven by a pressurized oil delivered from the hydraulic pump.

In order to solve the above described problem, a characteristic of a configuration employed by the present invention is that the control device includes: malfunction determining unit configured to determine whether or not the engine and/or the exhaust gas purifying device has a malfunction; and In case the malfunction is determined by the malfunction determining unit, engine limiting unit configured to limit a highest rotational speed of the engine to a second rotational speed (Nt) higher by a predetermined amount ($\alpha$) than a first rotational speed (Ns) at which an engine maximum torque (Tm) before the malfunction can be outputted and for limiting a maximum fuel injection quantity of the engine such that a rated torque (Tr) before the malfunction can be outputted at the first rotational speed (Ns).

With this arrangement, the engine limiting unit controls the highest rotational speed of the engine to the second rotational speed (Nt) and also controls the maximum fuel injection quantity of the engine such that the rated torque (Tr) before the malfunction can be outputted at the first rotational speed (Ns). Thus, in case it is determined by the malfunction determining unit that the engine or the exhaust gas purifying device is in the malfunction state, the highest rotational speed and the output torque of the engine are limited, whereby protection of the engine and the exhaust gas purifying device can be realized. In this case, by making the rated torque (Tr) capable of being outputted, engine stall can be suppressed. Therefore, even in the malfunction state, the hydraulic pump subjected to the constant torque control can be continuously driven, and the construction machine can be stably moved from the work site to the place for service. As a result, in a state in which the construction machine has been moved from the work site, required repair, replacement, service and the like can be performed.

(2) According to the present invention, the predetermined amount ($\alpha$) is set to a value in accordance with a temporary drop of the rotational speed caused by addition of a peak torque of the hydraulic pump to the engine.

With this arrangement, the predetermined amount ($\alpha$) which specifies the highest rotational speed at malfunction is set to a value in accordance with the temporary drop of the rotational speed caused by the addition of the peak torque of the hydraulic pump to the engine. Thus, even in the case of the drop of the rotational speed of the engine due to the peak torque of the hydraulic pump, the rated torque (Tr) can be outputted in a lowered rotational speed state. Therefore, reduction of the maximum rotational speed of the engine at the malfunction and suppression of the engine stall can be both realized at a high order. As a result, while the engine and the exhaust gas purifying device are protected, the construction machine at the malfunction can be stably moved.

(3) According to the present invention, in case the malfunction is determined by the malfunction determining unit, the control device stops the engine when a predetermined time (Mt) set in advance has elapsed. With this arrangement, by setting the predetermined time (Mt) when the engine is to be stopped as appropriate, enabling of movement of the construction machine and reduction of getting serious of the malfunction can be both realized.

(4) According to the present invention, in case the malfunction is determined by the malfunction determining unit, the control device prohibits start of the engine when a number of stop times of the engine reaches a specified number of times (Ct) set in advance. With this arrangement, by setting the specified number of times (Ct) of the engine for prohibiting start of the engine as appropriate, enabling of movement of the construction machine and prevention of excessive continuation of an operation can be both realized.

(5) According to the present invention, in case the malfunction is determined by the malfunction determining unit, the control device stops the engine when a predetermined time (Mt) set in advance has elapsed, and also prohibits start of the engine when a number of stop times of the engine reaches a specified number of times (Ct) set in advance. With this arrangement, enabling of movement of the construction machine, reduction of getting serious of the malfunction, and prevention of excessive continuation of the operation can be all realized.

BRIEF DESCRIPTION OF THE DRAWINGS

FIG. 3 is a configuration diagram showing an engine, a hydraulic pump, a control valve, a hydraulic actuator, an exhaust gas purifying device, a control device and the like.

MODE FOR CARRYING OUT THE INVENTION

Figure 1:
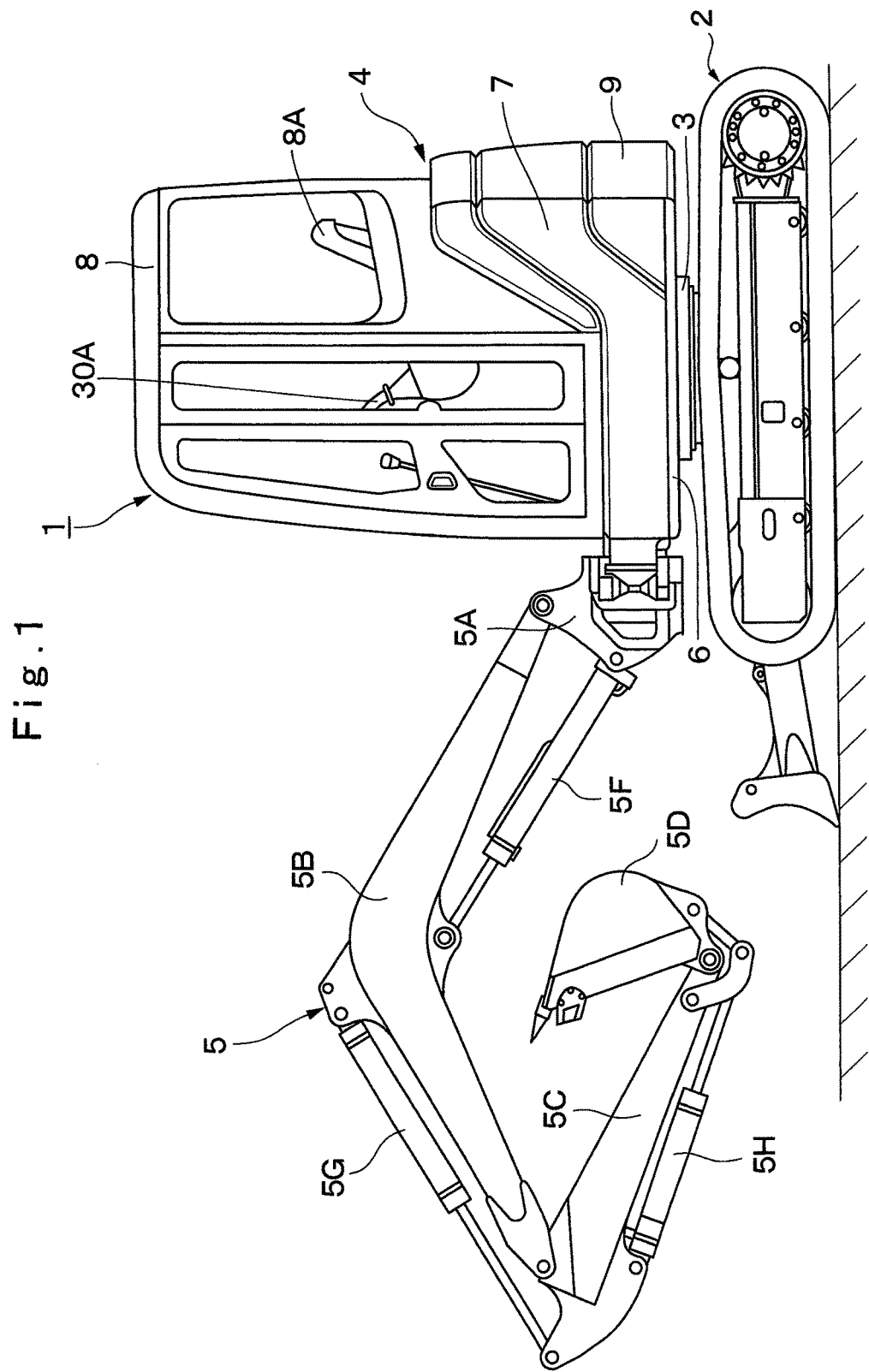
FIG. 1 is a front view showing a hydraulic excavator applied to a first embodiment of the present invention.

Embodiments of a construction machine according to the present invention will be described below in detail by referring to the attached drawings by using a case in which the present invention is applied to a small-sized hydraulic excavator called mini excavator as an example.

FIGS. 1 to 7 show a first embodiment of the construction machine according to the present invention.

In the figures, designated at 1 is a small-sized hydraulic excavator used for an excavating work, an earth removing work and the like. This hydraulic excavator 1 is roughly composed of an automotive crawler-type lower traveling structure 2, an upper revolving structure 4 rotatably mounted on the lower traveling structure 2 through a revolving device 3 and constituting a vehicle body together with the lower traveling structure 2, and a working mechanism 5 provided capable of moving upward/downward on a front side of the upper revolving structure 4.

Here, the working mechanism 5 is constituted as a swing-post type working mechanism and is provided with a swing post 5A, a boom 5B, an arm 5C, a bucket 5D as a working tool, a swing cylinder 5E for swinging the working mechanism 5 to left and right (see, FIG. 2), a boom cylinder 5F, an arm cylinder 5G, and a bucket cylinder 5H. The upper revolving structure 4 is composed of a revolving frame 6, an exterior cover 7, a cab 8, a counterweight 9 and the like which will be described later.

The revolving frame 6 forms a structural body of the upper revolving structure 4, and the revolving frame 6 is mounted on the lower traveling structure 2 through the revolving device 3. On the revolving frame 6, the counterweight 9 and an engine 10 which will be described later are provided on a rear side thereof, and the cab 8 which will be described later is provided on a front left side. On the revolving frame 6, the exterior cover 7 is provided between the cab 8 and the counterweight 9, and this exterior cover 7 defines a space accommodating the engine 10, a hydraulic pump 15, a heat exchanger 17, an exhaust gas purifying device 18 and the like together with the revolving frame 6, the cab 8, and the counterweight 9.

The cab 8 is mounted on the front left side of the revolving frame 6, and the cab 8 defines an operator's room on which an operator gets therein. Inside the cab 8, an operator's seat 8A on which the operator is seated, various operating levers 30A, an alarm device 37 (see, FIG. 3) and the like which will be described later are disposed.

Figure 2:
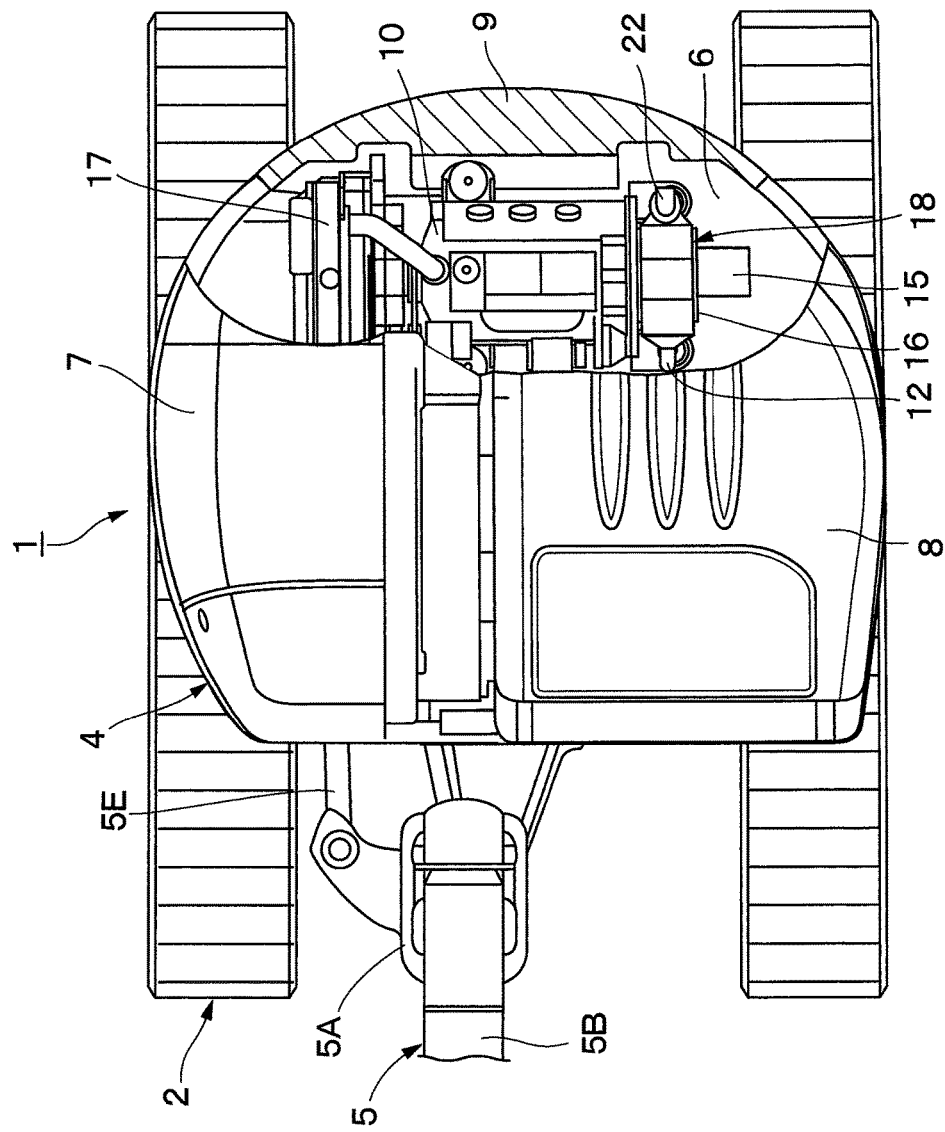
FIG. 2 is a partially broken plan view showing the hydraulic excavator in an enlarged manner in a state in which a part of a cab and an exterior cover in an upper revolving structure in FIG. 1 is removed.

The counterweight 9 is to take a weight balance with the working mechanism 5, and the counterweight 9 is located on the rear side of the engine 10 which will be described later and is mounted on a rear end portion of the revolving frame 6. As shown in FIG. 2, a rear surface side of the counterweight 9 is formed having an arc shape, and the counterweight 9 is configured to be contained in a vehicle body width of the lower traveling structure 2.

Indicated at 10 is the engine arranged in a laterally placed state on the rear side of the revolving frame 6, and since the engine 10 is mounted as a prime mover on the small-sized hydraulic excavator 1, it is constituted by using a small-sized diesel engine, for example. In the engine 10, an intake pipe 11 (see, FIG. 3) for taking in an outside air and an exhaust pipe 12 constituting a part of an exhaust gas passage for exhausting the exhaust gas are provided. The intake pipe 11 has the outside air (air) flow toward the engine 10, and an air cleaner 13 is connected to its tip end side for cleaning the outside air. In the middle of the intake pipe 11, an intake throttle valve 23 which will be described later is provided. On the other hand, in the exhaust pipe 12, the exhaust gas purifying device 18 which will be described later is connected and provided.

Here, the engine 10 is constituted by an electronically controlled engine and has a fuel supply amount variably controlled by an electronic governor 14 (see, FIG. 3) having an electronically controlled fuel injection device. That is, the electronic governor 14 variably controls the injection quantity of the fuel (fuel injection quantity) injected into a cylinder (not shown) of the engine 10 on the basis of a control signal outputted from an engine control device 40 which will be described later. As a result, the rotational number (rotational speed) of the engine 10 is controlled so as to be the rotation number corresponding to a target rotation number by the control signal from the engine control device 40.

The hydraulic pump 15 is provided on a left side of the engine 10, and the hydraulic pump 15 constitutes a main hydraulic source together with a hydraulic oil tank (not shown). As shown in FIG. 2, a power transmission device 16 is mounted on the left side of the engine 10, and through this power transmission device 16, a rotation output of the engine 10 is transmitted to the hydraulic pump 15. The hydraulic pump 15 is driven by the engine 10 so as to deliver the pressurized oil (hydraulic oil) toward a control valve 28 and the like which will be described later.

Here, for the hydraulic pump 15, a variable displacement type hydraulic pump subjected to constant torque control such that a product of delivery pressure P and a delivery flow rate Q becomes substantially constant so that a limited output horsepower of the engine 10 can be effectively used is used. That is, the hydraulic pump 15 is controlled such that a relationship between the delivery pressure of the pressurized oil (delivery pressure) P and the delivery flow rate (delivery amount flow rate) Q satisfies a "P-Q characteristic" of a characteristic line 43 indicated in FIG. 6 which will be described later (so as to follow the characteristic line 43).

Thus, the hydraulic pump 15 is constituted by a variable displacement type swash-plate, bent axis type or radial piston type hydraulic pump, for example. A displacement variable portion 15A of the hydraulic pump 15 is configured to be tilted/driven such that, if the delivery pressure P of the pressurized oil becomes high, the delivery flow rate Q is reduced in accordance with that, while if the delivery pressure P of the pressurized oil becomes low, the delivery flow rate Q is increased in accordance with that.

The heat exchanger 17 is located on the right side of the engine 10 and provided on the revolving frame 6, and the heat exchanger 17 includes a radiator, an oil cooler, and an intercooler, for example. That is, the heat exchanger 17 cools the engine 10 and the like and also cools the pressurized oil (hydraulic oil) returned to the hydraulic oil tank.

Next, a configuration of the engine 10, the exhaust gas purifying device 18 for purifying the exhaust gas exhausted from the engine 10, a hydraulic system driven by the hydraulic pump 15, and various sensors will be described.

Namely, designated at 18 is the exhaust gas purifying device provided on an exhaust side of the engine 10. As shown in FIG. 2, the exhaust gas purifying device 18 is disposed at a position on an upper left side of the engine 10 and on an upper side of the power transmission device 16, for example, and the exhaust pipe 12 of the engine 10 is connected to its upstream side. The exhaust gas purifying device 18 constitutes the exhaust gas passage together with the exhaust pipe 12 and removes harmful substances contained in this exhaust gas while the exhaust gas flows from the upstream side to the downstream side. More specifically, the particulate matter in the exhaust gas exhausted from the engine 10 is trapped by a particulate matter removing filter 21 which will be described later.

That is, the engine 10 made of the diesel engine is highly efficient and excellent in durability. However, in the exhaust gas of the engine 10, harmful substances such as the particulate matter (PM), nitrogen oxides (NOx), carbon monoxide (CO) and the like are contained. Thus, as shown in FIG. 3, the exhaust gas purifying device 18 mounted on the exhaust pipe 12 includes an oxidation catalyst 20 for oxidizing and removing carbon monoxide (CO) and the like in the exhaust gas, which will be described later, and the particulate matter removing filter 21 for trapping and removing the particulate matter (PM) in the exhaust gas, which will be described later.

Figure 3:
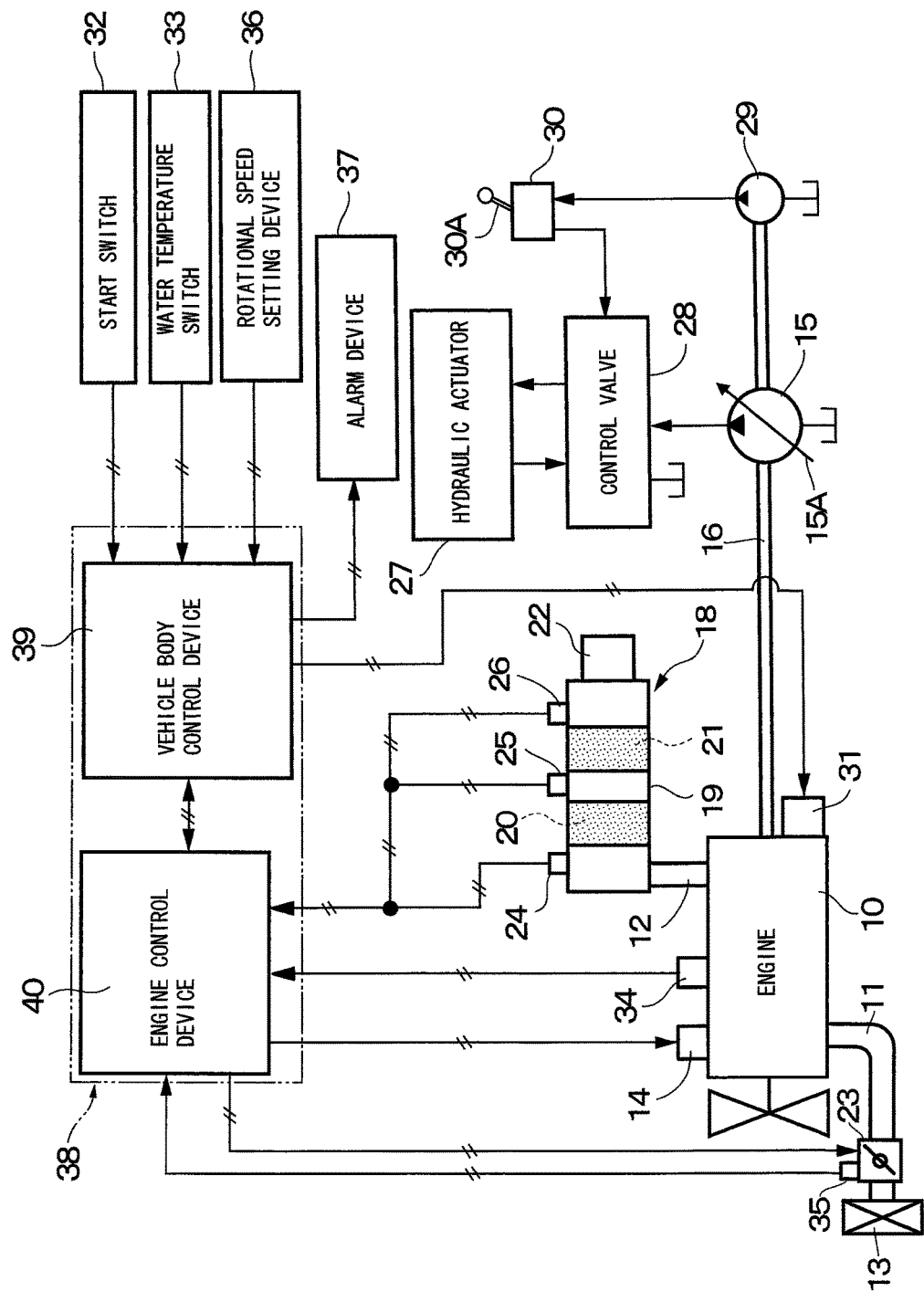

As shown in FIG. 3, the exhaust gas purifying device 18 has a cylindrical casing 19 constituted by detachably connecting a plurality of cylindrical bodies to front and rear, for example. In this casing 19, the oxidation catalyst 20 and the particulate matter removing filter 21 as a filter are removably accommodated.

The oxidation catalyst 20 is made of a cell-like cylindrical body made of ceramic having an outer diameter dimension equal to an inner diameter dimension of the casing 19, for example. In the oxidation catalyst 20, a large number of through holes (not shown) are formed in its axial direction, and its inner surface is coated with precious metal. The oxidation catalyst 20 has the exhaust gas flow through each of the through holes under a predetermined temperature condition and oxidizes and removes carbon monoxide (CO), hydrocarbon (HC) and the like contained in this exhaust gas and removes nitrogen oxides (NO) as nitrogen dioxide ($NO_2$).

On the other hand, the particulate matter removing filter 21 is arranged on a downstream side of the oxidation catalyst 20 in the casing 19. The particulate matter removing filter 21 traps the particulate matter in the exhaust gas exhausted from the engine 10 and burns and removes the trapped particulate matter so as to purify the exhaust gas. For this purpose, the particulate matter removing filter 21 is constituted by a cell-like cylindrical body in which a large number of small holes (not shown) are provided in an axial direction in a porous material made of a ceramic material, for example. As a result, the particulate matter removing filter 21 traps the particulate matter through the large number of small holes, and the trapped particulate matter is burned and removed by regeneration processing which will be described later. Therefore, the particulate matter removing filter 21 is regenerated.

A outlet port 22 is provided on a downstream side of the exhaust gas purifying device 18, and the outlet port 22 is located on the downstream side of the particulate matter removing filter 21 and connected to an outlet side of the casing 19. The outlet port 22 includes a funnel which emits the exhaust gas after purification processing to the atmospheric air and a muffler, for example.

The intake throttle valve 23 is provided on the intake pipe 11 side of the engine 10, and the intake throttle valve 23 constitutes a regenerating device performing regeneration processing of the particulate matter removing filter 21 in the exhaust gas purifying device 18. That is, the intake throttle valve 23 is held in an open valve state (an opening degree corresponding to the fuel injection quantity or a full open state, for example) at a normal time by a control signal from the engine control device 40 which will be described later. On the other hand, if the regeneration processing of the particulate matter removing filter 21 is to be performed, the intake throttle valve 23 is driven to a direction of throttling a passage by a control signal from the engine control device 40.

As a result, the intake throttle valve 23 throttles an intake air amount so that an air/fuel ratio between the air and the fuel tends to be rich. At this time, in a combustion chamber of the engine 10, by burning the fuel whose air/fuel ratio tends to be rich, a temperature of the exhaust gas exhausted to the exhaust pipe 12 side is raised, and the particulate matter trapped by the particulate matter removing filter 21 can be burned and removed.

An exhaust gas temperature sensor 24 detects a temperature of the exhaust gas. As shown in FIG. 3, the exhaust gas temperature sensor 24 is mounted on the casing 19 of the exhaust gas purifying device 18 and detects a temperature of the exhaust gas exhausted from the exhaust pipe 12 side, for example. The temperature detected by the exhaust gas temperature sensor 24 is outputted to the engine control device 40 which will be described later as a detection signal.

Pressure sensors 25 and 26 are provided on the casing 19 of the exhaust gas purifying device 18. As exemplified in FIG. 3, these pressure sensors 25 and 26 are arranged separately from each other on the upstream side (inlet side) and the downstream side (outlet side) of the particulate matter removing filter 21 and output the respective detection signals to the engine control device 40 which will be described later.

The engine control device 40 calculates a pressure difference $\Delta P$ between a pressure P1 on the upstream side detected by the pressure sensor 25 and a pressure P2 on the downstream side detected by the pressure sensor 26 in accordance with a formula 1 below. The engine control device 40 is to estimate deposited amounts, that is, the trapped amount of the particulate matter adhering to the particulate matter removing filter 21, an unburned residues and the like from a calculation result of the pressure difference $\Delta P$. In this case, the pressure difference $\Delta P$ becomes a small pressure value if the trapped amount is small and becomes a high pressure value as the trapped amount increases.

$$\Delta P = P1 - P2 \quad \text{[Formula 1]}$$

A plurality of hydraulic actuators 27 (only one of them is shown in FIG. 3) are driven by the pressurized oil delivered from the hydraulic pump 15. This hydraulic actuator 27 includes the swing cylinder 5E, the boom cylinder 5F, the arm cylinder 5G or the bucket cylinder 5H of the working mechanism 5. The hydraulic actuator 27 mounted on the hydraulic excavator 1 includes a hydraulic motor for traveling, a hydraulic motor for revolving, and an elevation cylinder for a blade (none of them is shown).

A plurality of control valves 28 (only one of them is shown in FIG. 3) constitute a directional control valve for the hydraulic actuator 27. This control valve 28 is provided between the hydraulic oil tank, the hydraulic pump 15, and each of the hydraulic actuators 27, respectively, and variably controls a flow rate and a direction of the pressurized oil to be supplied to each of the hydraulic actuators 27. That is, each of the control valves 28 is switched from a neutral position to left or right switching position (none of them is shown) by supply of a pilot pressure from an operating valve 30 which will be described later.

A pilot pump 29 is an auxiliary hydraulic pump constituting an auxiliary hydraulic source together with the hydraulic oil tank. As shown in FIG. 3, the pilot pump 29 is rotated/driven by the engine 10 together with the main hydraulic pump 15. The pilot pump 29 is to generate a pilot pressure which will be described later by delivering the hydraulic oil taken in from the inside of the hydraulic oil tank toward the pilot operating valve 30 and the like which will be described later.

The pilot operating valve 30 (hereinafter referred to as the operating valve 30) is a reducing-valve type pilot operating valve. The operating valve 30 is provided in the cab 8 of the hydraulic excavator 1 and has the operating lever 30A tiltably operated by the operator. The operating valve 30 is arranged in the number corresponding to the plurality of control valves 28 for remotely controlling the plurality of hydraulic actuators 27 individually. That is, when the operator tilts/operates the operating lever 30A, each of the operating valves 30 supplies a pilot pressure corresponding to its operation amount to a hydraulic pilot portion (not shown) of each of the control valves 28.

As a result, the control valve 28 is switched to either one of the switching positions from the neutral position. If the control valve 28 is switched to one of the switching positions, the hydraulic actuator 27 is driven in the applicable direction by the pressurized oil from the hydraulic pump 15 supplied in one direction. If the control valve 28 is switched to the other switching position, the hydraulic actuator 27 is driven in an opposite direction by the pressurized oil from the hydraulic pump 15 supplied in the other direction.

A starter 31 is to start the engine 10 and is constituted by an electric motor for rotating/driving a crank shaft of the engine 10 (none of them is shown). The starter 31 starts the engine 10 if the operator manually operates (that is, turns on the key) of a start switch 32 (see, FIG. 3) provided in the cab 8 of the hydraulic excavator 1, whereby the engine 10 is started.

A water temperature sensor 33 is to detect a temperature state of the engine 10, and the water temperature sensor 33 detects a temperature of a coolant of the engine 10 and outputs its detection signal to a vehicle body control device 39 which will be described later.

A rotational sensor 34 is to detect a rotation number (rotational speed) of the engine 10, and the rotational sensor 34 detects an engine rotational speed N and outputs its detection signal to the engine control device 40 which will be described later. The engine control device 40 monitors an actual rotational speed of the engine 10 on the basis of the detection signal of the engine rotational speed N and controls the engine rotational speed N in accordance with a target rotational speed set by a rotational speed setting device 36 which will be described later.

An opening degree sensor 35 is to detect an open valve state of the intake throttle valve 23, and the opening degree sensor 35 detects an opening degree of the intake throttle valve 23 and outputs its detection signal to the engine control device 40 which will be described later.

The rotational speed setting device 36 is to set the target rotational speed of the engine 10. This rotational speed setting device 36 is provided in the cab 8 (see, FIG. 1) of the hydraulic excavator 1 and is constituted by an operation dial, an up/down switch or an engine lever (none of them is shown) manually operated by the operator. The rotational speed setting device 36 is to output an instruction signal of the target rotational speed in accordance with the operation by the operator to the vehicle body control device 39 which will be described later.

The alarm device 37 is provided in the vicinity of the operator's seat in the cab 8. The alarm device 37 is connected to (the vehicle body control device 39 of) a control device 38 which will be described later, and notifies that the engine 10 or the exhaust gas purifying device 18 has a malfunction and that an operation is restricted due to the malfunction to the operator on the basis of an instruction (alarm signal) from the control device 38 (the vehicle body control device 39 or the engine control device 40). Here, the alarm device 37 may be constituted by a buzzer emitting an alarm sound, a speaker emitting voice, a sound synthesizing device, a lamp or a monitor displaying alarm contents and the like. The alarm device 37 emits an alarm sound or an alarm display on the basis of an instruction (alarm signal) from the control device 38 so as to notify it to the operator in case the malfunction is determined by the control device 38.

Subsequently, the control device 38 for controlling the engine 10 and the body of the hydraulic excavator 1 will be described.

Namely, designated at 38 is the control device of the hydraulic excavator 1, and the control device 38 includes the vehicle body control device 39 and the engine control device 40 as shown in FIG. 3. In the control device 38, an inlet side of the vehicle body control device 39 is connected to the start switch 32, the water temperature sensor 33, the rotational speed setting device 36, the engine control device 40 and the like, for example. An output side of the vehicle body control device 39 is connected to the starter 31, the alarm device 37, the engine control device 40 and the like.

The vehicle body control device 39 of the control device 38 performs start control of the engine 10 by starting the starter 31 when the start switch 32 is operated to turn on the key. The vehicle body control device 39 also has a function for outputting an instruction signal for setting the target rotational speed of the engine 10 to the engine control device 40 in accordance with a signal outputted from the rotational speed setting device 36 and the like.

The engine control device 40 performs predetermined calculation processing on the basis of an instruction signal outputted from the vehicle body control device 39 and a detection signal of the engine rotational speed N outputted from the rotational sensor 34 and the like and outputs a control signal instructing a target fuel injection quantity to the electronic governor 14 of the engine 10. The electronic governor 14 of the engine 10 increases/decreases an injection quantity of the fuel to be injected/supplied into the combustion chamber (not shown) of the engine 10 in accordance with the control signal or stops injection of the fuel. As a result, the rotational speed of the engine 10 is controlled so as to become a rotational speed corresponding to the target rotational speed instructed by the instruction signal from the vehicle body control device 39. Therefore, the engine control device 40 can control the rotational speed of the engine 10 in accordance with a set value (target rotational speed) by the rotational speed setting device 36.

The engine control device 40 has a function (protection mode operation function) of limiting the highest rotational speed and the maximum fuel injection quantity of the engine 10 as compared with those at the normal time (before malfunction) if the engine 10 or the exhaust gas purifying device 18 is in the malfunction state, that is, if they cannot exert desired performances due to an influence of the fuel characteristic or use environment. The malfunction state of the engine 10 or the exhaust gas purifying device 18 includes a case of a trouble caused by an incorrect operation, a failure or the like in the intake throttle valve 23, the exhaust gas temperature sensor 24, the pressure sensors 25 and 26, the water temperature sensor 33, the rotational sensor 34, the opening degree sensor 35 and the like, a case of an excessive rise of the temperature of an engine coolant or a fuel, a case of excessive deposition of a particulate matter on the particulate matter removing filter 21 of the exhaust gas purifying device 18 and the like.

Here, the engine control device 40 has its input side connected to the exhaust gas temperature sensor 24, the pressure sensors 25 and 26, the rotational sensor 34, the opening degree sensor 35, the vehicle body control device 39 and the like. The output side of the engine control device 40 is connected to the electronic governor 14 of the engine 10, the intake throttle valve 23, the vehicle body control device 39 and the like. The engine control device 40 has a memory portion (not shown) composed of a ROM, a RAM, a nonvolatile memory and the like, and the memory portion stores a processing program for performing output control of the engine 10 shown in FIG. 4 and the like, a torque curve (characteristic lines 41 and 42 in FIG. 5) at the normal time and at the malfunction set in advance and the like which will be described later.

Figure 4:
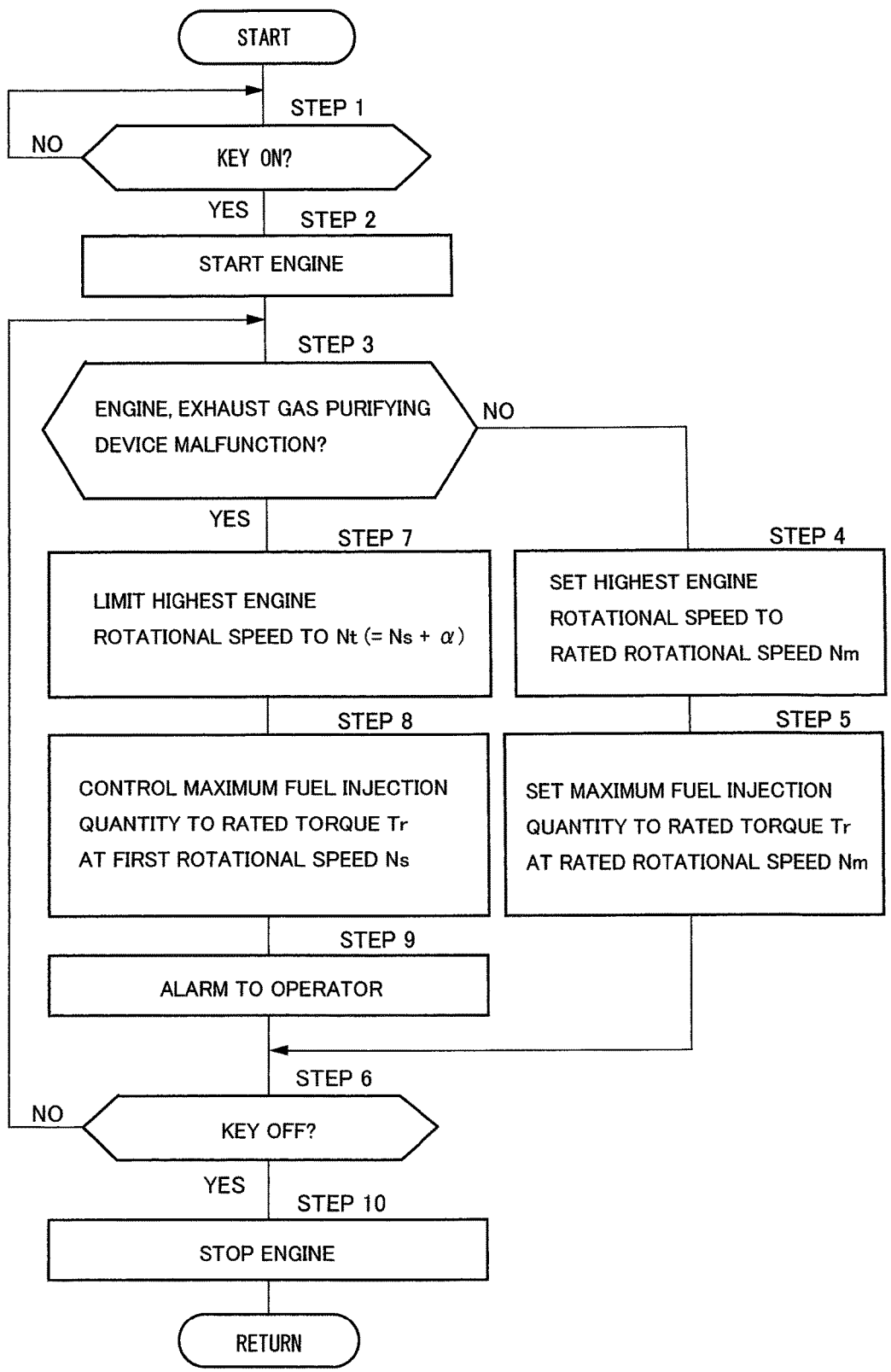
FIG. 4 is a flowchart showing control contents by the control device in FIG. 3.

The engine control device 40 performs malfunction determining processing for determining whether or not the engine 10 and/or the exhaust gas purifying device 18 has a malfunction in accordance with the processing program shown in FIG. 4. In case the malfunction is determined, the engine control device 40 performs operation restriction processing for limiting the highest rotational speed and the maximum fuel injection quantity of the engine 10.

Figure 5:
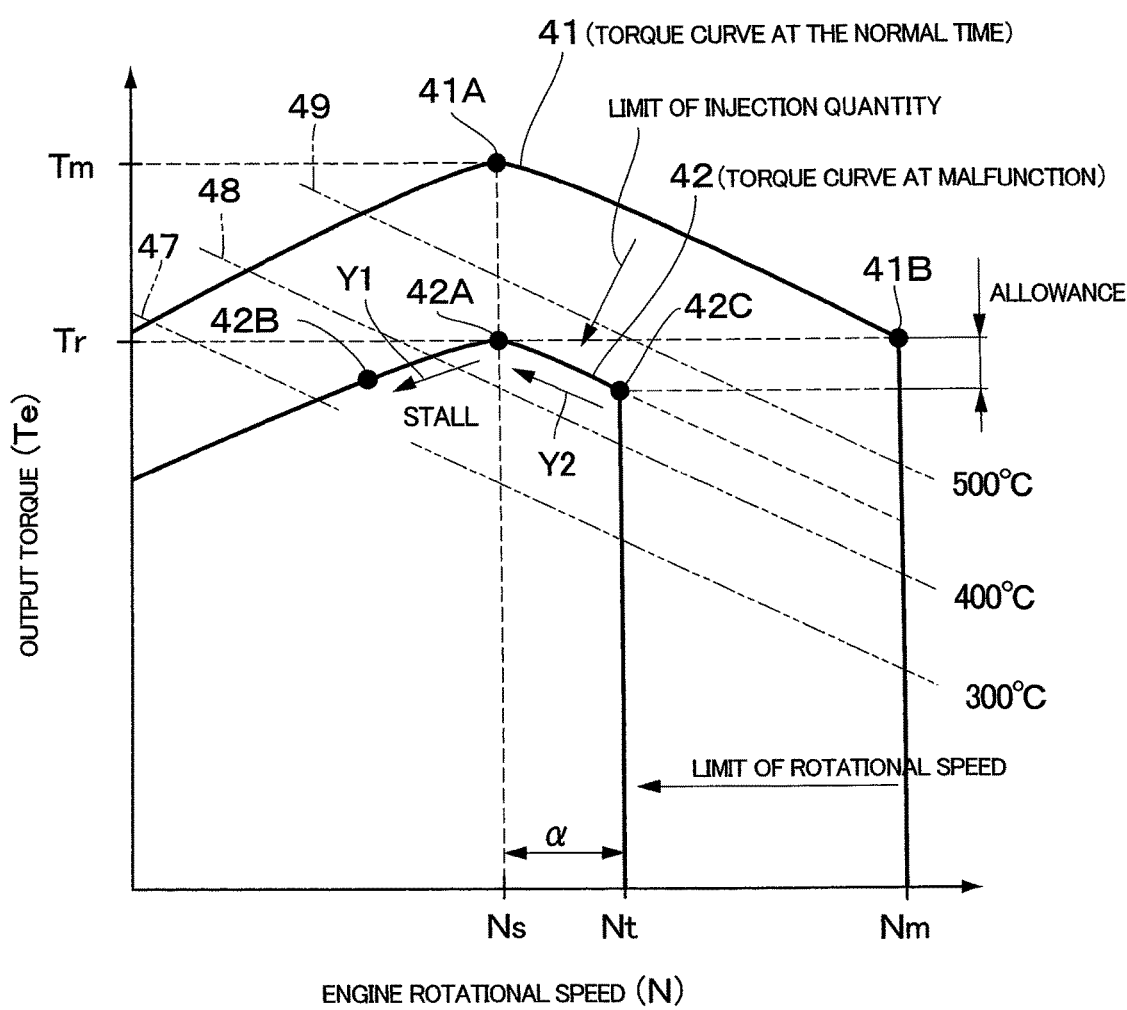
FIG. 5 is a characteristic line diagram showing a relationship between an engine rotational speed and an output torque as torque curves at normal time and at malfunction.

Here, an output torque Te of the engine 10 has a torque characteristic as the characteristic line 41 (torque curve at the normal time) shown in FIG. 5 with respect to the engine rotational speed N during a normal operation. It should be noted that the characteristic line 41 corresponds to the torque characteristic of the engine 10 in an operation with the maximum fuel injection quantity at the normal time. In this normal operation, when the engine rotational speed N is a first rotational speed Ns, the output torque Te of the engine 10 becomes a maximum torque Tm, and when the engine rotational speed N is a rated rotational speed (highest rotational speed at the normal time) Nm higher than the first rotational speed Ns, the output torque Te of the engine 10 becomes a rated torque Tr.

That is, the characteristic line 41 in FIG. 5 is a torque curve having a substantially mountain shape (projecting upward) as a whole. In the characteristic line 41, as the engine rotational speed N becomes higher (increases) toward the first rotational speed Ns, the output torque Te becomes larger and reaches a maximum torque output point 41A at the first rotational speed Ns. As the engine rotational speed N becomes higher than the first rotational speed Ns, the output torque Te becomes smaller and reaches a rated torque output point 41B at the rated rotational speed Nm which is the highest rotational speed at the normal time.

On the other hand, in case the engine 10 or the exhaust gas purifying device 18 enters a malfunction state, a protection mode operation for protecting the engine 10 or the exhaust gas purifying device 18, that is, control for lowering the engine output by limiting the fuel injection quantity as compared with the normal time is performed. Specifically, as the characteristic line 42 (torque curve at malfunction) shown in FIG. 5, the highest rotational speed and the maximum fuel injection quantity at the malfunction are limited. The characteristic line 42 corresponds to the torque characteristic of the engine 10 when the engine 10 is operated with the maximum fuel injection quantity at the malfunction.

At this malfunction, the highest rotational speed is limited to a second rotational speed Nt higher by a predetermined amount α than the first rotational speed Ns that can output the engine maximum torque Tm at before the malfunction (normal time) and also, the maximum fuel injection quantity of the engine 10 at the malfunction is limited so that the rated torque Tr before the malfunction can be outputted at the first rotational speed Ns. That is, the characteristic line 42 which is a torque curve at the malfunction becomes a maximum torque output point 42A at the first rotational speed Ns, and at this maximum torque output point 42A, the rated torque Tr can be outputted. The highest rotational speed is regulated to the second rotational speed Nt higher by the predetermined amount α than the first rotational speed Ns, and the predetermined amount α is set to a value corresponding to temporary drop of the engine rotational speed N due to addition of a peak torque of the hydraulic pump 15 to the engine 10.

Next, the purpose that the torque characteristic (torque curve) at the malfunction of the engine 10 is limited to the characteristic line 42 shown in FIG. 5 will be described.

Figure 6:
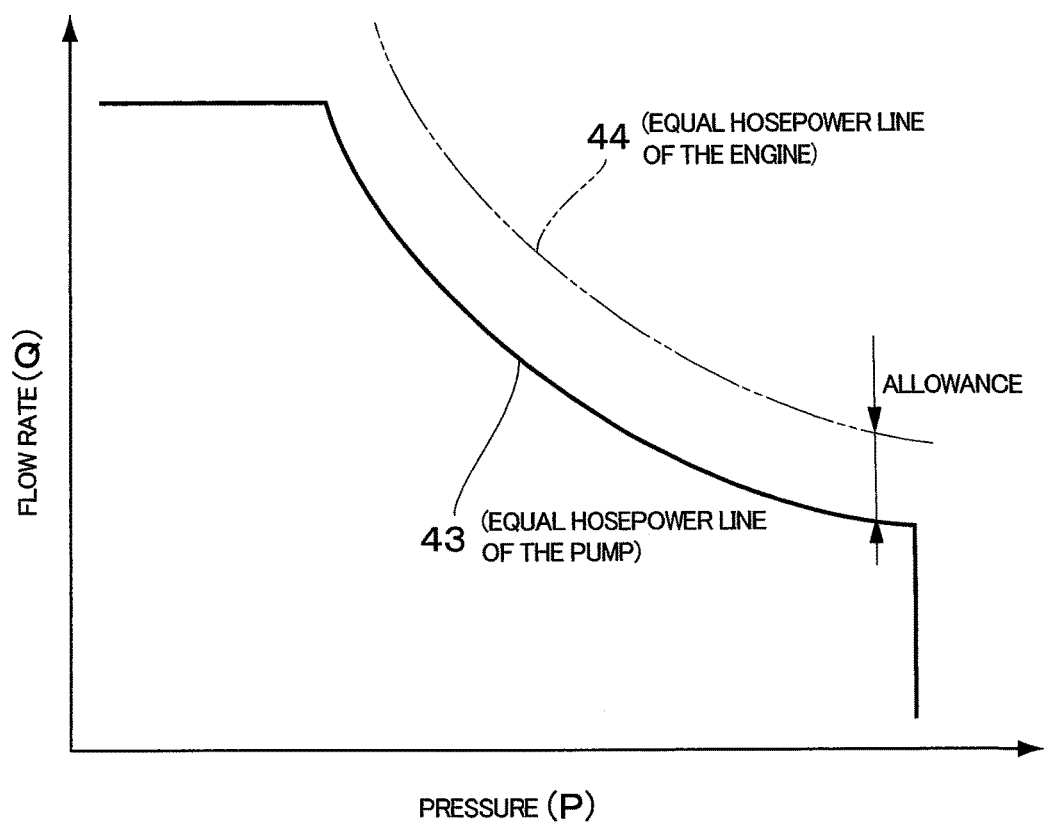
FIG. 6 is a characteristic line diagram showing a relationship between a delivery pressure and a delivery flow rate of the hydraulic pump.

FIG. 6 shows a P-Q characteristic of the hydraulic pump 15 of the hydraulic excavator 1. The hydraulic pump 15 is subjected to constant torque control (equal horsepower control) so that a product of the delivery pressure P and the delivery flow rate Q becomes substantially constant (equal horsepower) as the characteristic line 43 shown in FIG. 6. That is, the characteristic line 43 in FIG. 6 is an equal horsepower line corresponding to the hydraulic maximum torque of the hydraulic pump 15, and the hydraulic pump 15 is controlled so as to follow the characteristic line 43.

With respect to such characteristic line 43 of the hydraulic pump 15, the characteristic line 44 in FIG. 6 shows the equal horsepower line at an output of the rated torque of the engine 10. That is, the equal horsepower line (characteristic line 44) at the output of the rated torque of the engine 10 is larger to some degree than the equal horsepower line (characteristic line 43) corresponding to the hydraulic maximum torque of the hydraulic pump 15 (allowance is given). As a result, it is configured such that the engine 10 does not stall by outputting the rated torque Tr in the engine 10 with respect to the hydraulic maximum torque of the hydraulic pump 15.

Thus, in the first embodiment, the protection mode operation when the engine 10 or the exhaust gas purifying device 18 has a malfunction is configured such that the rated torque Tr can be outputted at the first rotational speed Ns at which the maximum torque of the engine 10 can be outputted so that the engine 10 does not stall even during the protection mode operation.

On the other hand, the highest rotational speed of the engine 10 at the malfunction is preferably as small as possible from the viewpoint of protection of the engine 10. Thus, the highest rotational speed of the engine 10 at the malfunction may be limited to the first rotational speed Ns that can output the maximum torque of the engine 10, for example, so that the rated torque Tr can be outputted at this first rotational speed Ns. That is, it can be configured such that the engine 10 is operated at the maximum torque output point 42A in the characteristic line 42 at the malfunction.

However, if the engine 10 is operated at the maximum torque output point 42A at the malfunction as above, if the peak torque of the hydraulic pump 15 is added to the engine 10, it is concerned that the engine stalls. That is, as in the characteristic line 45 shown in FIG. 7, a hydraulic torque Tp of the hydraulic pump 15 rises to a value exceeding the maximum torque (peak torque) temporarily when the hydraulic actuator 27 is driven from a no load state of the hydraulic pump 15, for example, specifically from a state in which all the hydraulic actuators 27 shown in FIG. 3 are stopped, and all the control valves 28 are held at the neutral position (OFF state). The rotational speed N of the engine 10 is temporarily lowered by addition of the peak torque of the hydraulic pump 15 as a characteristic line 46 shown in FIG. 7.

In this case, by limiting the highest rotational speed of the engine 10 at the malfunction to the first rotational speed Ns and by operating the engine 10 at the maximum torque output point 42A in the characteristic line 42, when the engine rotational speed N is temporarily lowered, the output torque Te of the engine 10 moves from the position of the maximum torque output point 42A in FIG. 5 to an output point 42B as indicated by an arrow Y1. As a result, the output torque Te of the engine 10 is lowered, and it becomes more likely that engine stall occurs.

Figure 7:
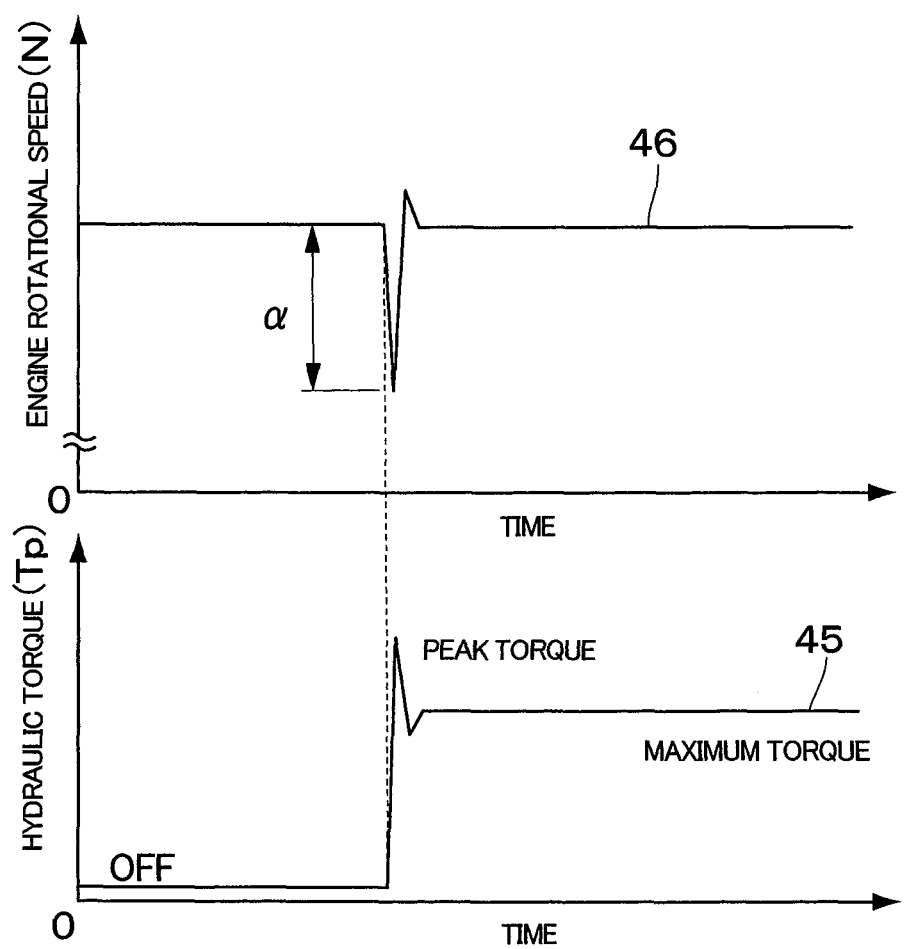
FIG. 7 is a characteristic line diagram showing an example of time change in a hydraulic torque and the engine rotational speed.

On the other hand, in the first embodiment, the highest rotational speed of the engine 10 at the malfunction is configured to become a value higher than the first rotational speed Ns, that is, the second rotational speed Nt higher by the predetermined amount α than the first rotational speed Ns. In this case, as shown in FIGS. 6 and 7, the predetermined amount α is set to a value according to the temporary drop of the rotational speed of the engine 10 caused by addition of the peak torque of the hydraulic pump 15 to the engine 10. That is, as shown in FIG. 7, the predetermined amount α is set so as to be substantially equal to the temporary lowered amount of the rotational speed of the engine 10 associated with the peak torque of the hydraulic pump 15.

In such first embodiment, by operating the engine 10 at the second rotational speed Nt at the malfunction, at this second rotational speed Nt, the output torque Te becomes an output point 42C, which is slightly smaller than the rated torque Tr. However, even if the rotational speed N of the engine 10 is temporarily lowered due to the addition of the peak torque of hydraulic pump 15, the output torque Te of the engine 10 moves from the position of the output point 42C in the characteristic line 42 in FIG. 5 to the maximum torque output point 42A as indicated by an arrow Y2. Therefore, with a drop of the rotational speed of the engine 10, the output torque Te of the engine 10 becomes larger, and when the peak torque is added, the rated torque Tr which is the maximum torque at the malfunction can be outputted from the engine 10. As a result, even if the highest rotational speed and the maximum fuel injection quantity of the engine 10 are limited so as to perform the protection mode operation at the malfunction, the engine 10 can be given resistance against engine stall, and engine stall can be made difficult to occur.

The small-sized hydraulic excavator 1 according to the first embodiment has the configuration described above, and its operation will be described below.

The operator of the hydraulic excavator 1 gets on the cab 8 of the upper revolving structure 4, starts the engine 10, and drives the hydraulic pump 15 and the pilot pump 29. As a result, the pressurized oil is delivered from the hydraulic pump 15, and this pressurized oil is supplied to the hydraulic actuator 27 through the control valve 28. From the control valve (not shown) other than this, supply is made to the other hydraulic actuators (hydraulic motors for traveling and revolving or other hydraulic cylinders and the like, for example). When the operator onboard the cab 8 operates the operating lever (not shown) for traveling, the vehicle can be advanced or retreated by the lower traveling structure 2.

On the other hand, the operator in the cab 8 can perform an excavating work of earth and sand and the like by moving the working mechanism 5 upward/downward by operating the operating lever 30A of the operating valve 30 shown in FIG. 3, for example. Since the small-sized hydraulic excavator 1 has a small revolving radius by the upper revolving structure 4, even in a small work site such as a city area, for example, the gutter excavating work or the like can be performed by the working mechanism 5 while revolving/ driving the upper revolving structure 4, and in such a case, a noise can be reduced by operating the engine 10 in a light load state in some cases.

During the operation of the engine 10, particulate matter which is a harmful substance is exhausted from its exhaust pipe 12. At this time, the exhaust gas purifying device 18 can oxidize and remove hydrocarbon (HC), nitrogen oxides (NO), and carbon monoxide (CO) in the exhaust gas by the oxidation catalyst 20. The particulate matter removing filter 21 traps the particulate matter contained in the exhaust gas and burns and removes (regenerates) the trapped particulate matter. As a result, the purified exhaust gas can be exhausted from the outlet port 22 on the downstream side to the outside.

Incidentally, the engine 10 or the exhaust gas purifying device 18 might enter the malfunction state in which they cannot exert desired performances due to an influence of the fuel characteristic or use environment. For example, there might be a malfunction state in the case of a failure in the intake throttle valve 23, the exhaust gas temperature sensor 24, the pressure sensors 25 and 26, the water temperature sensor 33, the rotational sensor 34, the opening degree sensor 35 and the like, the case of an excessive rise of the temperature of the engine coolant or the fuel, the case of excessive deposition of the particulate matter on the particulate matter removing filter 21 of the exhaust gas purifying device 18 and the like. In this case, if the operation is continued as it is, there is a concern that the malfunction becomes serious or the like.

Thus, in the first embodiment, the engine control device 40 determines whether or not the engine 10 and/or the exhaust gas purifying device 18 has a malfunction during operation (while operating). Moreover, in case the malfunction is determined, the engine control device 40 limits the highest rotational speed and the maximum fuel injection quantity of the engine 10 as compared with the normal time. Specifically, the engine control device 40 performs processing shown in FIG. 4 so as to execute malfunction determination processing and operation restriction processing (engine limitation processing).

When a processing operation shown in FIG. 4 is started, it is determined at Step 1 whether or not the start switch 32 has been "key ON". If it is determined at this Step 1 to be "NO", that is, the switch has not been "key ON", the routine returns to immediately before Step 1, and the processing at Step 1 is repeated. If it is determined at this Step 1 to be "YES", that is, the switch has been "key ON", the routine proceeds to the subsequent Step 2, the starter 31 is operated, and the engine 10 is started.

At the subsequent Step 3, it is determined whether or not the engine 10 and/or the exhaust gas purifying device 18 has a malfunction. This determination can be made (self-diagnosed) by checking, if a predetermined signal (self-check signal) is given to each of the sensors 24, 25, 26, 33, 34, 35 and the like, whether or not the predetermined signal is returned from each of the sensors 24, 25, 26, 33, 34, and 35 and/or whether or not the predetermined detection result can be obtained from each of the sensors 24, 25, 26, 33, 34, and 35 in a predetermined operation state.

At Step 3, if it is determined to be "NO", that is, the engine 10 and the exhaust gas purifying device 18 does not have a malfunction (in a normal state), the routine proceeds to Step 4, where the highest rotational speed (highest engine rotation number) of the engine 10 is set to the rated rotational speed Nm and at Step 5, the maximum fuel injection quantity is set such that the rated torque Tr can be outputted at the rated rotational speed Nm. That is, at Step 4 and Step 5, the torque characteristic of the engine 10 is set to the characteristic line 41 (torque curve at the normal time) shown in FIG. 5 so as to perform the engine output control at the normal time.

As a result, if there is no malfunction in the engine 10 and the exhaust gas purifying device 18, the engine 10 is controlled so as to have the characteristic line 41 shown in FIG. 5. In this case, if the operator sets the rotational speed setting device 36 to a high idling rotational speed which is the highest rotational speed, for example, the engine 10 is operated at the rated torque output point 41B of the characteristic line 41.

If the torque characteristic of the engine 10 at the normal time has been set at Step 4 and Step 5, the routine proceeds to Step 6, and it is determined whether or not the start switch 32 has been "key OFF". If it is determined at this Step 6 to be "NO", that is, the start switch has not been "key OFF", the routine returns to before Step 3, and the processing at Step 3 and after is repeated.

On the other hand, if it is determined at Step 3 to be "YES", that is, the engine 10 and/or the exhaust gas purifying device 18 has a malfunction, the routine proceeds to Step 7. At this Step 7, the highest rotational speed (highest engine rotation number) of the engine 10 is limited to the second rotational speed Nt, that is, the second rotational speed Nt higher by the predetermined amount $\alpha$ (=Ns+$\alpha$) than the first rotational speed Ns. Subsequently, at Step 8, the maximum fuel injection quantity is limited such that the rated torque Tr can be outputted at the first rotational speed Ns. That is, at Step 7 and Step 8, the torque characteristic of the engine 10 is set to the characteristic line 42 (torque curve at the malfunction) shown in FIG. 5 so as to perform the output limitation control (operation in the protection mode) of the engine 10.

Therefore, if the engine 10 and/or the exhaust gas purifying device 18 has a malfunction, the engine 10 is controlled so as to have the characteristic line 42 shown in FIG. 5. In this case, if the operator sets the rotational speed setting device 36 to the high idling rotational speed which is the highest rotational speed, for example, the engine 10 is operated at the output point 42C of the characteristic line 42.

As a result, even if the rotational speed N of the engine 10 is temporarily lowered as shown in FIG. 7 by the peak torque of the hydraulic pump 15, the output torque Te of the engine 10 is moved from the position of the output point 42C in the characteristic line 42 in FIG. 5 to the maximum torque output point 42A as indicated by the arrow Y2. Thus, even if the highest rotational speed and the maximum fuel injection quantity of the engine 10 are limited in order to protect the engine 10 or the exhaust gas purifying device 18 at the malfunction, engine stall can be made difficult to occur.

When the torque characteristic of the engine 10 at the malfunction has been set at Step 7 and Step 8, the routine proceeds to Step 9, and the fact that the engine 10 and/or the exhaust gas purifying device 18 has a malfunction and the fact that the output of the engine 10 is limited due to the malfunction are notified to the operator. That is, an alarm signal indicating that an alarm sound, an alarm display or the like is emitted is outputted from the control device 38 to the alarm device 37, and the fact that there is a malfunction and the fact that the output of the engine 10 is limited (operating in the protection mode) are notified to the operator. Subsequently, the routine proceeds to Step 6.

If it is determined at Step 6 to be "YES", that is, the "key OFF" has been made, the routine proceeds to Step 10, and the engine 10 is stopped. In this case, the routine returns to start through return and the processing at Step 1 and after is repeated.

Thus, according to the first embodiment, at Step 7 and Step 8, the highest rotational speed of the engine 10 is limited to the second rotational speed Nt and also, the maximum fuel injection quantity of the engine 10 is limited so that the rated torque Tr before the malfunction can be outputted at the first rotational speed Ns. Thus, if it is determined at Step 3 that the engine 10 or the exhaust gas purifying device 18 has a malfunction, by limiting the highest rotational speed and the output torque of the engine 10, the engine 10 or the exhaust gas purifying device 18 can be protected. In this case, by enabling output of the rated torque Tr, engine stall can be suppressed. Therefore, the hydraulic pump 15 subjected to constant torque control can be continuously driven even at the malfunction, and the hydraulic excavator 1 can be moved stably from the work site to the place for service. As a result, in a state in which the hydraulic excavator 1 has been moved from the work site, required repair, replacement, service and the like can be performed.

According to the first embodiment, the predetermined amount α specifying the highest rotational speed at the malfunction is set to a value according to the temporary drop of the rotational speed caused by addition of the peak torque of the hydraulic pump 15 to the engine 10. Thus, at the malfunction, even if the rotational speed of the engine 10 is lowered by the peak torque of the hydraulic pump 15, the rated torque Tr can be outputted in a state in which the rotational speed is lowered. Therefore, reduction of the maximum rotational speed at the malfunction and suppression of engine stall can be both realized at a high order. As a result, while the engine 10 and the exhaust gas purifying device 18 are protected, the hydraulic excavator 1 can be moved stably at the malfunction.

Moreover, according to the first embodiment, by performing control such that the torque characteristic of the engine 10 at the malfunction becomes the characteristic line 42 in FIG. 5, excessive deposition of the particulate matter on the particulate matter removing filter 21 of the exhaust gas purifying device 18 can be also suppressed. That is, in FIG. 5, a characteristic line 47 as an equal exhaust gas temperature line of 300° C., a characteristic line 48 as an equal exhaust gas temperature line of 400° C., and a characteristic line 49 as an equal exhaust gas temperature line of 500° C. are indicated, respectively. As is obvious from each of these characteristic lines 47, 48, and 49, by driving the engine 10 at the output point 42C in the characteristic line 42 at the malfunction, the exhaust gas temperature can be kept between 400 to 500° C. As a result, combustion (regeneration) of the particulate matter trapped by the particulate matter removing filter 21 can be promoted, and excessive deposition of the particulate matter on the particulate matter removing filter 21 can be suppressed.

It should be noted that in the first embodiment, the processing at Step 3 shown in FIG. 4 is a specific example of malfunction determining unit which is a constituent requirement of the present invention, and the processing at Steps 7 and 8 shows a specific example of engine limiting unit which is a constituent requirement of the present invention.

Figure 8:
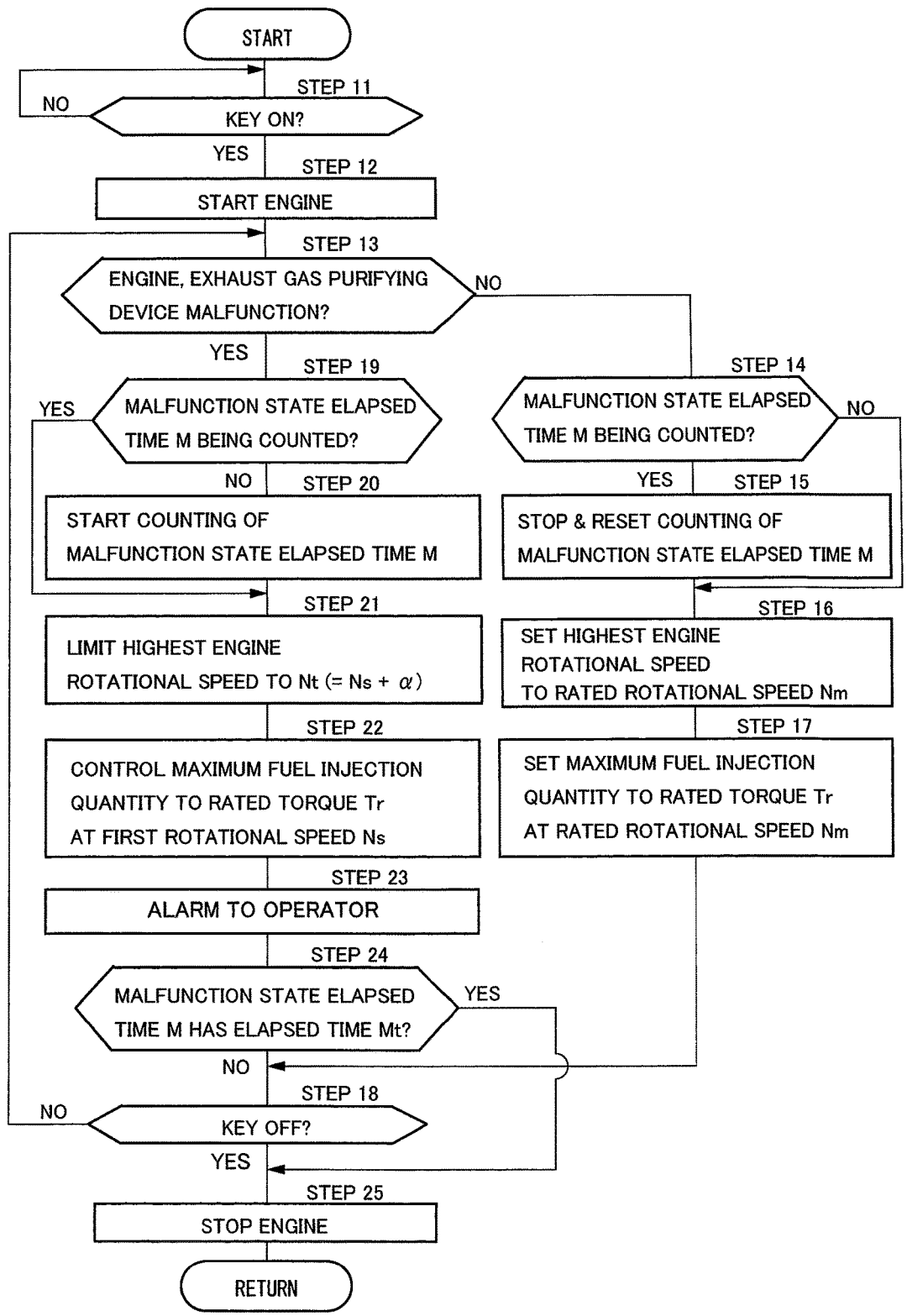
FIG. 8 is a flowchart showing control contents of a control device according to a second embodiment.

Next, FIG. 8 shows a second embodiment of the present invention. A feature of the second embodiment is a configuration in which, if the malfunction determining unit determines a malfunction, the engine is automatically stopped after a predetermined time Mt set in advance has elapsed. In the second embodiment, component elements that are identical to those in the foregoing first embodiment will be simply denoted by the same reference numerals to avoid repetitions of similar explanations.

When a processing operation shown in FIG. 8 is started, processing from Step 11 to Step 13 is performed similarly to Step 1 to Step 3 in FIG. 4 by the first embodiment. In the second embodiment, if it is determined at Step 13 to be "NO", that is, the engine 10 and the exhaust gas purifying device 18 do not have a malfunction (in a normal state), the routine proceeds to Step 14, where it is determined whether or not malfunction state elapsed time M is being counted. That is, at Step 14, after it is determined that the engine 10 and/or the exhaust gas purifying device 18 has a malfunction at the processing (previous processing) prior to the processing this time, it is determined whether or not counting of the malfunction state elapsed time M has been already started at the processing at Step 20 which will be described later.

If it is determined at this Step 14 to be "NO", that is, the malfunction state elapsed time M is not being counted (counting has not been started), the routine proceeds to Step 16 without going through Step 15. Step 16 and Step 17 set the torque characteristic of the engine 10 to the characteristic line 41 (torque curve at the normal time) shown in FIG. 5 similarly to Step 4 and Step 5 in FIG. 4 by the first embodiment so as to perform engine output control at the normal time. At the subsequent Step 18, similarly to Step 6 in FIG. 4 in the first embodiment, it is determined whether or not the start switch 32 has been "key OFF".

On the other hand, if it is determined at Step 14 to be "YES", that is, the malfunction state elapsed time M is being counted (counting has been already started), the routine proceeds to Step 15, and counting of the malfunction state elapsed time M is stopped, and the malfunction state elapsed time M is reset to zero. That is, if it is determined to be "YES" at Step 14, it corresponds to a case in which, though the engine 10 and/or the exhaust gas purifying device 18 is determined to be malfunction at the previous processing, the engine 10 and the exhaust gas purifying device 18 are determined to be normal at this processing.

Such a case can be considered that, though the engine 10 and/or the exhaust gas purifying device 18 is determined to have a malfunction due to a transient malfunction caused by an incorrect operation and the like of the sensors 24, 25, 26, 33, 34, 35 and the like, for example, at the previous processing, the malfunction is returned to the normal state (normal) at this processing. Thus, at Step 15, counting of the malfunction state elapsed time M is stopped, and the malfunction state elapsed time M is reset at zero. Subsequently, the routine proceeds to Step 16, and engine output control at the normal time is performed.

On the other hand, if it is determined at Step 13 to be "YES", that is, the engine 10 and/or the exhaust gas purifying device 18 has a malfunction, the routine proceeds to Step 19, and it is determined whether or not the malfunction state elapsed time is being counted. If it is determined at this Step 19 to be "NO", that is, the malfunction state elapsed time M is not being counted (counting has not been started), the routine proceeds to Step 20, counting of the malfunction state elapsed time M is started, and the routine proceeds to Step 21. On the other hand, at Step 19, if it is determined to be "YES", that is, the malfunction state elapsed time M is being counted (counting has been already started), the routine proceeds to Step 21 without going through Step 20.

At Step 21 and Step 22, the torque characteristic of the engine 10 is set to the characteristic line 42 (torque curve at the malfunction) shown in FIG. 5 so as to perform the output limitation control (protection mode operation) of the engine 10 similarly to Step 7 and Step 8 in FIG. 4 by the first embodiment. At the subsequent Step 23, similarly to Step 9 in FIG. 4 by the first embodiment, the fact that there is a malfunction and the fact that the output of the engine 10 is limited are notified to the operator.

At Step 24, it is determined whether or not the malfunction state elapsed time M has exceeded the predetermined time Mt set in advance (M>Mt), that is, whether or not the predetermined time Mt (15 minutes, for example) has elapsed from determination as a malfunction. It should be noted that this predetermined time Mt is set to a value on the basis of an experiment, calculation, simulation or the like in advance so that enabling of movement of the hydraulic excavator 1 and reduction of getting serious of the malfunction can be both realized.

If it is determined at Step 24 to be "NO", that is, the malfunction state elapsed time M has not exceeded the predetermined time Mt (M≤Mt), the routine proceeds to Step 18. At Step 18, if it is determined to be "NO", that is, "key OFF" has not been made, the routine returns to immediately before Step 13, and the processing at Step 13 and after is repeated. If it is determined at Step 18 to be "YES", that is, "key OFF" has been made, the routine proceeds to Step 25, where the engine 10 is stopped. In this case, the routine returns to start through return, and the processing at Step 1 and after is repeated.

On the other hand, at Step 24, if it is determined to be "YES", that is, the malfunction state elapsed time M has exceeded the predetermined time Mt (M>Mt), the routine proceeds to Step 25 without going through Step 18, and the engine 10 is automatically stopped.

The second embodiment is to perform the output control of the engine 10 by the processing shown in FIG. 8 as described above, and its basic action is not particularly different from that of the above described first embodiment.

Particularly, the second embodiment is configured such that, if it is determined that the engine 10 and/or the exhaust gas purifying device 18 has a malfunction, the engine 10 is automatically stopped when the predetermined time Mt set in advance has elapsed. Thus, by setting the predetermined time Mt as appropriate, enabling of movement of the hydraulic excavator 1 and reduction of getting serious of the malfunction can be both realized.

It should be noted that in the second embodiment, the processing at Step 13 shown in FIG. 8 is a specific example of the malfunction determining unit which is a constituent requirement of the present invention, and the processing at Steps 21 and 22 shows a specific example of the engine limiting unit which is a constituent requirement of the present invention.

Figure 9:
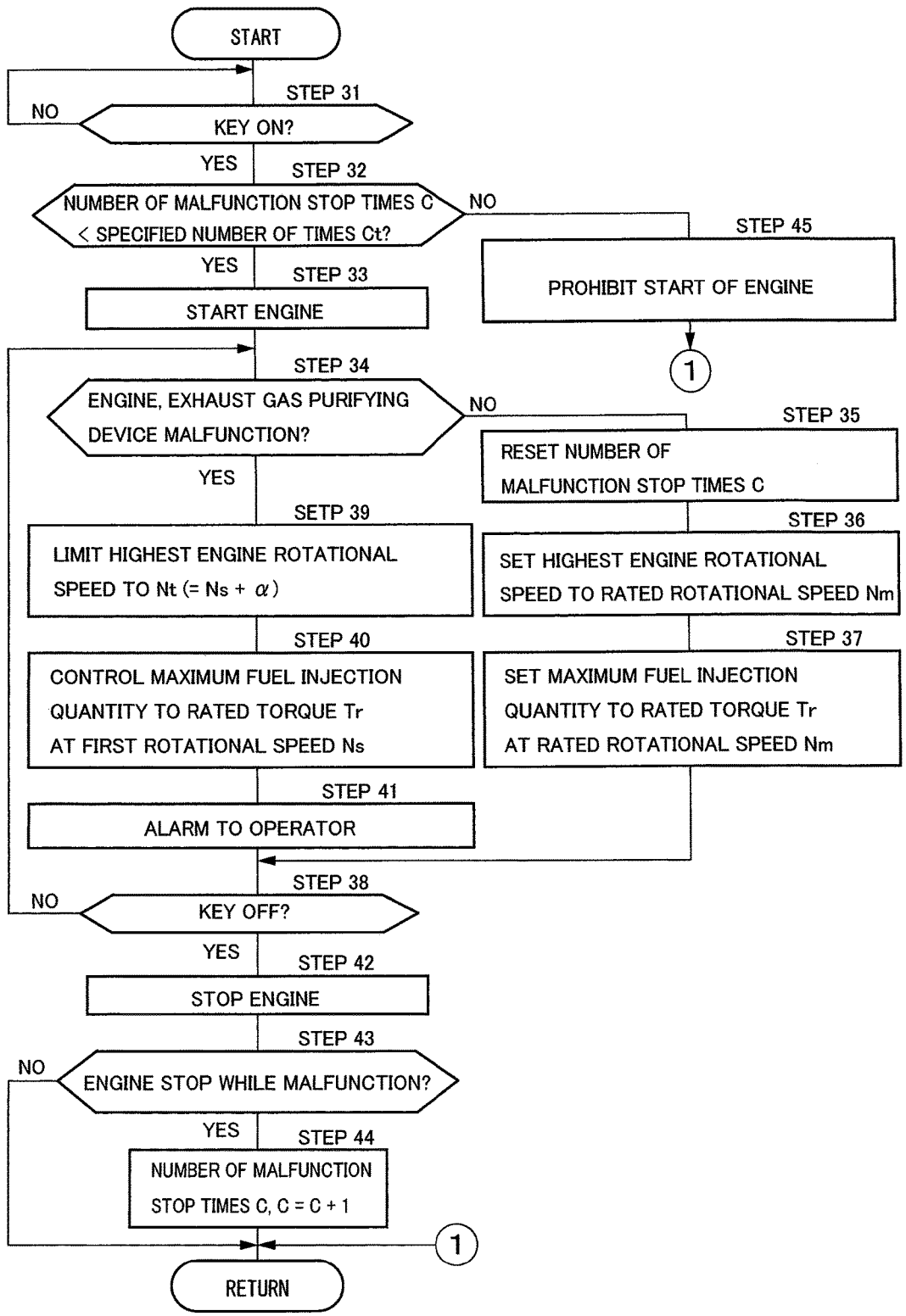
FIG. 9 is a flowchart showing control contents of a control device according to a third embodiment.

Next, FIG. 9 shows a third embodiment of the present invention. A feature of the third embodiment is that, if the malfunction determining unit determines a malfunction, start of the engine is prohibited if the number of stop times of the engine reaches a specified number of times Ct set in advance in configuration. In the third embodiment, component elements that are identical to those in the foregoing first embodiment will be simply denoted by the same reference numerals to avoid repetitions of similar explanations.

When a processing operation shown in FIG. 9 is started, at Step 31, similarly to Step 1 in FIG. 4 by the first embodiment, it is determined whether or not the start switch 32 has been "key ON". If it is determined at this Step 31 to be "YES", that is, the start switch has been "key ON", the routine proceeds to Step 32. At this Step 32, it is determined whether or not a number of malfunction stop times C which is the number of stops of the engine 10 from determination as a malfunction has reached the specified number of times Ct (3 times, for example) set in advance, that is, whether or not the number of malfunction stop times C is less than the specified number of times Ct (C<Ct). It should be noted that this specified number of times Ct is set to a value on the basis of an experiment, calculation, simulation or the like in advance so that enabling of movement of the hydraulic excavator 1 and prevention of excessive continuation of the operation can be both realized.

At this Step 32, if it is determined to be "YES", that is, the number of malfunction stop times C has not reached the specified number of times Ct (the number of malfunction stop times C is less than the specified number of times Ct), the routine proceeds to Step 33, and similarly to Step 2 in FIG. 4 by the first embodiment, the starter 31 is operated, and the engine 10 is started. At the subsequent Step 34, similarly to Step 3 in FIG. 4 by the first embodiment, it is determined whether or not the engine 10 and/or the exhaust gas purifying device 18 has a malfunction.

At this Step 34, if it is determined to be "NO", that is, the engine 10 and the exhaust gas purifying device 18 does not have a malfunction (in the normal state), the routine proceeds to Step 35, and the number of malfunction stop times C is reset to zero. That is, Step 35 is to reset the number of malfunction stop times C to zero, if it is determined that there is no malfunction in the processing this time, even though the number of malfunction stop times C has been counted since the engine 10 was stopped since it was determined to have a malfunction in the previous processing. That is, in the processing at this Step 35, even if the number of malfunction stop times C has been counted when the state has recovered to the normal state (normal) from a transient malfunction, the number of malfunction stop times C is reset to zero. If the number of malfunction stop times is zero for the first, it stays at zero even if it is reset. If the number of malfunction stop times C is reset to zero at Step 35, the routine proceeds to Step 36.

Since the processing from Step 36 to Step 42 in FIG. 9 is similar to the processing from Step 4 to Step 10 in FIG. 4 by the first embodiment, the explanation of processing will be omitted.

If the engine 10 is stopped at Step 42, at Step 43, it is determined whether or not the engine 10 was stopped in a state in which it was determined to have a malfunction in the processing at Step 34 immediately before the engine 10 is stopped. In case it is determined at this Step 43 to be "NO", that is, the engine 10 has not been stopped in the state determined to have a malfunction, the routine proceeds to return without going through Step 44 and returns to start. On the other hand, if it is determined at Step 43 to be "YES", that is, the engine 10 was stopped in the state determined to have a malfunction, the routine proceeds to Step 44, 1 is added to the number of malfunction stop times C, proceeds to return and returns to start. An initial value of the number of malfunction stop times C is zero.

Moreover, at the above described Step 32, if it is determined to be "NO", that is, the number of malfunction stop times C has reached the specified number of times Ct (the number of malfunction stop times C is equal to or more than the specified number of times Ct), the routine proceeds to Step 45 without proceeding to the processing at Step 33 and after (without starting the engine 10). At Step 45, start of the engine 10 is prohibited, and the routine proceeds to return. As a result, the engine 10 can be no longer started.

The third embodiment is to perform the output control of the engine 10 by the processing shown in FIG. 9 as described above, and its basic action is not particularly different from that of the above described first embodiment.

Particularly, in the case of the third embodiment, it is configured such that, if it is determined that the engine 10 and/or the exhaust gas purifying device 18 has a malfunction, when the number of malfunction stop times C of the engine 10 reaches the specified number of times Ct set in advance, start of the engine 10 is prohibited. Thus, by setting the specified number of times Ct as appropriate, enabling of movement of the hydraulic excavator 1 and prevention of excessive continuation of the operation can be both realized.

It should be noted that in the third embodiment, the processing at Step 34 shown in FIG. 9 is a specific example of the malfunction determining unit which is a constituent requirement of the present invention, and the processing at Steps 39 and 40 show a specific example of the engine limiting unit which is a constituent requirement of the present invention.

In the above described second embodiment, the case configured such that the engine 10 is stopped if the predetermined time Mt has elapsed since it was determined to have a malfunction was described as an example, and in the above described third embodiment, the case configured such that the start of the engine 10 is prohibited if the number of stop times of the engine 10 reaches the specified number of times Ct since it was determined to have a malfunction was described as an example. However, the present invention is not limited to them, and both the configuration in which the engine 10 is stopped if the predetermined time Mt has elapsed since it was determined to have a malfunction and the configuration in which the start of the engine 10 is prohibited if the number of stop times of the engine 10 reaches the specified number of times Ct since it was determined to have a malfunction may be combined in configuration.

In each of the above described embodiments, the case in which the exhaust gas purifying device 18 is constituted by the oxidation catalyst 20 and the particulate matter removing filter 21 is described as an example. However, the present invention is not limited to that, and a urea injection valve, a selectively reducing catalyst device and the like may be combined in use, for example, other than the oxidation catalyst and the particulate matter removing filter in configuration.

Moreover, in the above described embodiments, the case in which the exhaust gas purifying device 18 is mounted on the small-sized hydraulic excavator 1 is described as an example. However, the construction machine provided with the exhaust gas purifying device according to the present invention is not limited to that, and the present invention may be applied to a hydraulic excavator of a medium size or larger, for example. Moreover, the present invention can be also widely applied to the construction machines such as a hydraulic excavator provided with a wheel-type lower traveling structure, a wheel loader, a forklift, a hydraulic crane and the like.

DESCRIPTION OF REFERENCE NUMERALS

1: Hydraulic excavator (Construction machine)
2: Lower traveling structure (Vehicle body)
4: Upper revolving structure (Vehicle body)
10: Engine
14: Electronic governor
15: Hydraulic pump
18: Exhaust gas purifying device
27: Hydraulic actuator
38: Control device

The invention claimed is:

1. An engine output control device for a construction machine including:
   an automotive vehicle body;
   an engine mounted on said vehicle body;
   an exhaust gas purifying device provided on an exhaust side of said engine and purifying an exhaust gas;
   a hydraulic pump of a variable displacement type driven by said engine and subjected to constant torque control so that a product of a delivery pressure (P) and a delivery flow rate (Q) becomes constant; and
   a hydraulic actuator driven by a pressurized oil delivered from said hydraulic pump,
   wherein said ermine has characteristics in which a maximum torque (Tm) at a normal operation is outputted when said ermine is at a first rotational speed (Ns), an output torque (Te) becomes smaller as an ermine rotational speed (N) of said ermine becomes higher than said first rotational speed (Ns), and a rated torque (Tr) is outputted at a rated rotational speed (Nm) which is a highest rotational speed of said engine at the normal operation, and
   said engine output control device is connected to said engine and comprises:
   a processor; and
   a memory connected to the processor, the memory storing instructions that, when executed by the processor, cause the processor to:
   determine whether or not said engine and/or said exhaust gas purifying device has a malfunction; and
   when the malfunction is determined, limit a highest rotational speed of said engine to a second rotational speed (Nt) higher by a predetermined amount than the first rotational speed (Ns) at which said engine outputs said maximum torque (Tm) at the normal operation, and limit a maximum fuel injection quantity of said engine such that said rated torque (Tr) at the normal operation can be outputted by said engine at said first rotational speed (Ns),
   wherein said predetermined amount is set in accordance with a temporary drop of the rotational speed caused by addition of a peak torque of said hydraulic pump to said engine.

2. The engine output control device for the construction machine according to claim 1, wherein the memory further stores instructions that, when executed by the processor, cause the processor to:
   stop said engine when a predetermined time (Mt) has elapsed after determining the malfunction.

3. The engine output control device for the construction machine according to claim 1, wherein the memory further stores instructions that, when executed by the processor, cause the processor to:
   prohibit starting of said engine when a number of stop times of said engine reaches a specified number (Ct).

4. The engine output control device for the construction machine according to claim 1, wherein the memory further stores instructions that, when executed by the processor, cause the processor to:
   stop said engine when a predetermined time (Mt) has elapsed after determining the malfunction, and also prohibit starting of said engine when a number of stop times of said engine reaches a specified number (Ct).

5. A construction machine comprising:
an automotive vehicle body;
an engine mounted on said vehicle body and wherein said engine has characteristics in which a maximum torque (Tm) at a normal operation is outputted when said engine is at a first rotational speed (Ns), an output torque (Te) becomes smaller as an engine rotational speed (N) of said engine becomes higher than said first rotational speed (Ns), and a rated torque (Tr) is outputted at a rated rotational speed (Nm) which is a highest rotational speed of said engine at the normal operation;
an exhaust gas purifying device provided on an exhaust side of said engine that purifies an exhaust gas;
a hydraulic pump of a variable displacement type driven by said engine and subject to a constant torque control so that a product of a delivery pressure (P) and a delivery flow rate (Q) becomes constant; and
a hydraulic actuator driven by pressurized oil delivered from said hydraulic pump,
an engine output control device connected to said engine and including:
a processor; and
a memory connected to the processor, the memory storing instructions that, when executed by the processor, cause the processor to:
determine whether or not said engine and/or said exhaust gas purifying device has a malfunction; and
when the malfunction is determined, limit a highest rotational speed of said engine to a second rotational speed (Nt) higher by a predetermined amount than the first rotational speed (Ns) at which said engine outputs said maximum torque (Tm) at the normal operation and limit a maximum fuel injection quantity of said engine such that said rated torque (Tr) at the normal operation can be outputted by said engine at said first rotational speed (Ns),
wherein said predetermined amount is set in accordance with a temporary drop of the rotational speed caused by addition of a peak torque of said hydraulic pump to said engine.

* * * * *